J. W. SEARS.
DIRIGIBLE AUTOMOBILE HEADLIGHT.
APPLICATION FILED MAR. 2, 1917.

1,240,784.  
Patented Sept. 18, 1917.

Inventor  
J. W. SEARS  
By H. S. Kie  
Attorney

UNITED STATES PATENT OFFICE.

JOHNIE W. SEARS, OF HALE CENTER, TEXAS.

DIRIGIBLE AUTOMOBILE-HEADLIGHT.

1,240,784.　　　　Specification of Letters Patent.　　Patented Sept. 18, 1917.

Application filed March 2, 1917.　Serial No. 151,994.

*To all whom it may concern:*

Be it known that I, JOHNIE W. SEARS, a citizen of the United States, residing at Hale Center, in the county of Hale, State of Texas, have invented a new and useful Dirigible Automobile-Headlight; and I do hereby declare the following to be a full, clear, and exact description of the invention, such as will enable others skilled in the art to which it appertains to make and use the same.

The present invention relates to a dirigible headlight attachment for automobiles, and has for its object to provide a device of this character which embodies novel features of construction whereby the headlights will be automatically turned with the front wheels, thereby causing the light to be thrown in the direction in which the vehicle is moving and enabling sharp corners to be turned with safety at night.

Further objects of the invention are to provide a dirigible automobile headlight which is comparatively simple and inexpensive in its construction, which can be readily applied to the conventional types of automobiles, which can be adjusted to fit different makes of vehicles, and which will successfully withstand the hard usage to which such devices are subjected.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Corresponding and like parts are referred to in the following description and indicated in all the views of the drawings by the same reference characters.

Figure 1:
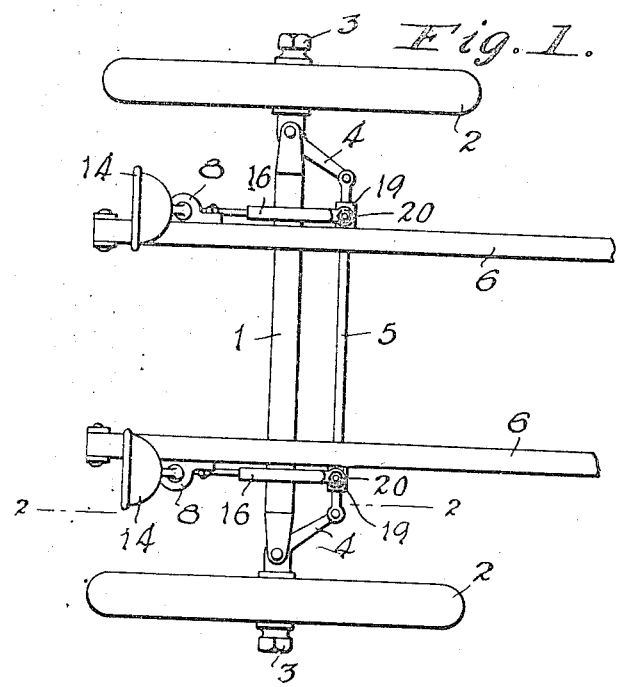
Figure 1 is a top plan view of the forward end of an automobile chassis, showing the dirigible headlights as applied thereto.
Figure 2:
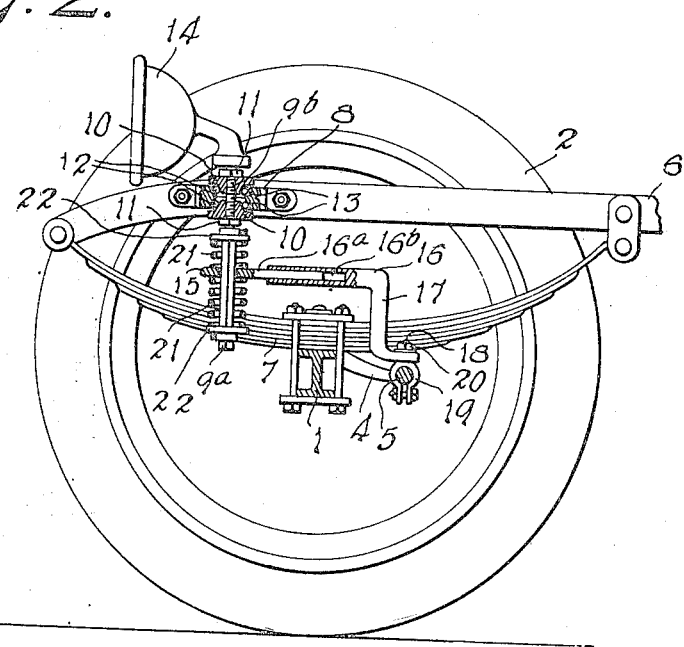
Fig. 2 is an enlarged longitudinal vertical sectional view on the line 2—2 of Fig. 1.

Referring to the drawings, the numeral 1 designates the front axle of a conventional automobile chassis, the front wheels 2 being journaled upon spindles 3, and the spindles being provided with arms 4 which are connected by the usual rod 5 so that both of the front wheels can be simultaneously turned when steering the vehicle to the right or to the left. The numerals 6 designate the side bars of the vehicle frame, the usual semi-elliptic springs 7 being interposed between the forward ends of the side bars and the front axle. This is all of the well-known and conventional construction, the front wheels being adapted to be operatively connected to any suitable type of steering mechanism.

A bearing bracket 8 is bolted or otherwise rigidly secured to the forward end of each of the side bars 6 of the vehicle frame, said brackets projecting laterally from the side bars and receiving the upper ends of upright shafts 9. The lower ends of the shafts 9 are polygonal in cross section, as indicated at $9^a$, while the upper ends thereof are threaded, as indicated at $9^b$. A pair of opposed cones 10 are fitted adjustably upon the threaded upper end $9^b$ of each of the upright shafts 9, said cones being locked in an adjusted position by jam nuts 11 and engaging balls 12 which travel upon oppositely inclined raceways 13 in the bearing brackets 8. A headlight 14 is rigidly applied to the upper extremity of each of the upright shafts 9 so as to turn therewith.

Slidable up and down upon the lower polygonal portion $9^a$ of each of the upright shafts 9 is a correspondingly shaped polygonal eye 15, said eye being carried by the forward end of a rearwardly extending horizontal arm 16, the opposite end of the said arm terminating in a downwardly extending elbow 17 which engages a pivot stud 18 projecting upwardly from a clamp 19 applied to the spindle arm connecting rod 5. A nut 20 is shown as applied to the upper end of the pivot stud 18 for the purpose of holding the elbow 17 in engagement therewith. The rearwardly extending horizontal arm 16 is extensible, being shown as formed in telescoping sections $16^a$ and $16^b$. This construction provides in an effective manner for the necessary play between the parts as the spindle arm connecting rod 5 is moved back and forth to turn the front wheels when steering the vehicle. It also enables the length of the arm to be increased or decreased as may be necessary when applying the dirigible headlights to different makes of automobiles.

Coil springs 21 are arranged upon the polygonal end $9^a$ of each of the upright shafts 9 above and below the eye 15, being confined between bearing plates 22 which are adjustable upon the upright shaft and can be set in any desired position thereon. These springs take up any looseness and prevent rattling of the parts, although it will be obvious that the eye 15 is always free to slide up and down upon the upright shaft and thereby compensates for the relative movements of the vehicle frame and axle, due to the resilient mounting of the former.

The headlights 14 are rigidly fitted upon the upper ends of the respective vertical shafts 9, and the horizontally disposed swinging arms 16 are connected to the upright shafts 9 in such a manner as to turn the latter. These arms 16 are also operatively connected to the spindle arm connecting rod 5, so that the headlights are turned simultaneously with the front wheels 2 and are thereby caused to throw the light in the direction in which the vehicle is turning, thereby enabling a sharp turn to be made with safety at night.

Having thus described the invention, what I claim as new and desire to secure by Letters Patent, is:—

A dirigible automobile headlight, including a bearing bracket applied to the vehicle frame, an upright shaft journaled in the bearing bracket and formed with a polygonal lower end, a lamp rigidly applied to the upper end of the shaft, a rearwardly extending swinging arm provided at its forward end with a polygonal eye which is slidable on the polygonal lower end of the upright shaft, said swinging arm being formed in telescoping sections, and a pivot stud carried by the spindle arm connecting rod of the vehicle and pivotally engaging the rear end of the swinging arm.

In testimony whereof I have signed my name to this specification in the presence of two subscribing witnesses.

JOHNIE W. SEARS.

Witnesses:
JAS. L. MONROE,
S. O. PARKER.